United States Patent [19]

Hutzenlaub

[11] 4,339,055

[45] Jul. 13, 1982

[54] TANK CLOSURE ARRANGEMENT

[75] Inventor: Rolf Hutzenlaub, Stuttgart, Fed. Rep. of Germany

[73] Assignee: Daimler-Benz Aktiengesellschaft, Stuttgart, Fed. Rep. of Germany

[21] Appl. No.: 234,628

[22] Filed: Feb. 17, 1981

[30] Foreign Application Priority Data

Feb. 14, 1980 [DE] Fed. Rep. of Germany ....... 3005419

[51] Int. Cl.³ .................... B65D 41/06; B65D 41/36
[52] U.S. Cl. .................... 220/295; 220/298; 220/293; 220/DIG. 33
[58] Field of Search ............ 220/293, 295, 298, 299, 220/300, DIG. 32, DIG. 33

[56] References Cited

U.S. PATENT DOCUMENTS 4,294,375 10/1981 Gerdes ............................. 220/293
4,304,339 12/1981 Sakai ............................... 220/295

*Primary Examiner*—George T. Hall
*Attorney, Agent, or Firm*—Craig and Antonelli

[57] ABSTRACT

A tank closure, especially for a tank of a motor vehicle, with a bayonet cap having a pair of tension clamps. The tension clamps, during a rotation of the cap, are axially displaceable through the bayonet-type thread at the tank neck and are urged against the thread by a helical compression spring. The spring rests on a bracket of a closing pipe guided in a housing of the cap and joined thereto so that the spring urges the closing pipe, especially a flange associated therewith and covered with a sealing ring of rubber or the like, elastically resilient material onto an annular sealing surface of the tank neck. A self-lubricating synthetic resin spacer sleeve, that is, a sleeve which readily slides on metal, is inserted between the flange of the closing pipe and the pair of tension clamps. The spacer sleeve remains stationary during a turning of the cap and maintains, along a largest portion of a pivoting or turning angle of the cap up to a final range of turning, a predetermined spacing between the flange and the pair of tension clamps, which spacing is reduced in a final or locked condition of the cap.

17 Claims, 6 Drawing Figures

U.S. Patent  Jul. 13, 1982  4,339,055
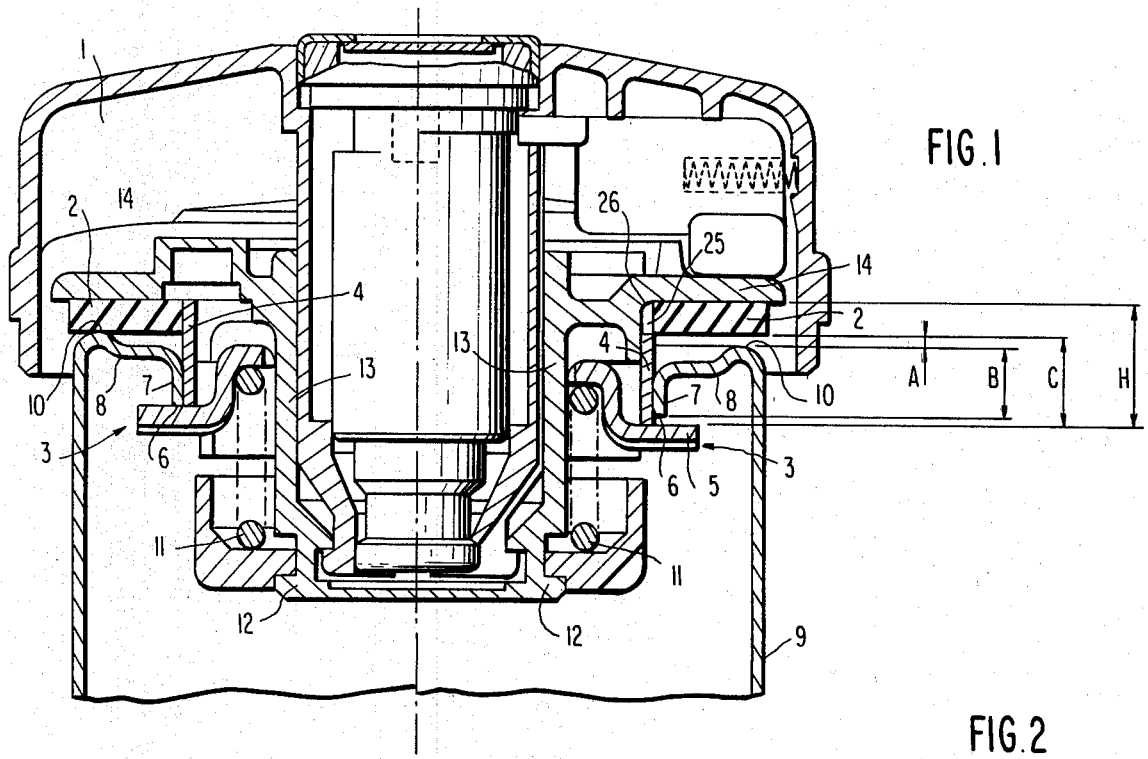
FIG.1
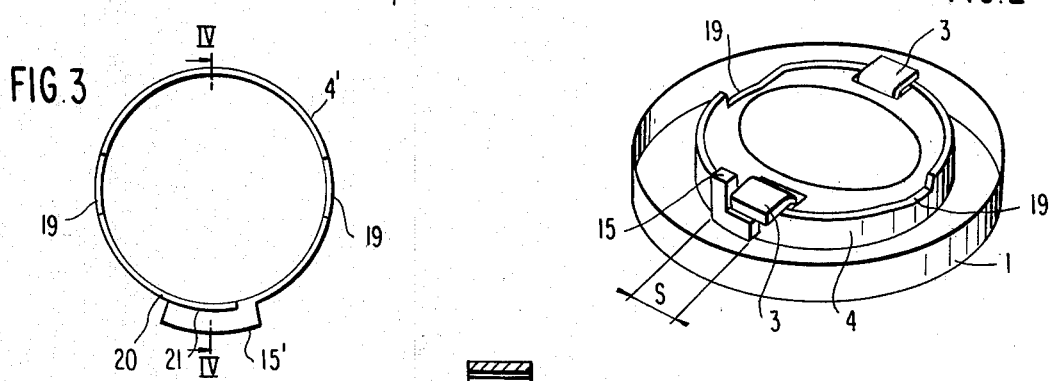
FIG.2
FIG.3
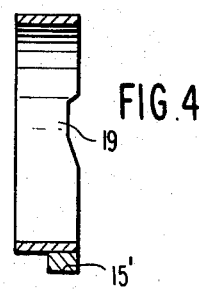
FIG.4
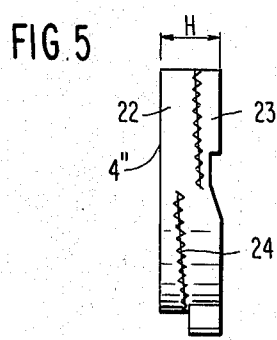
FIG.5
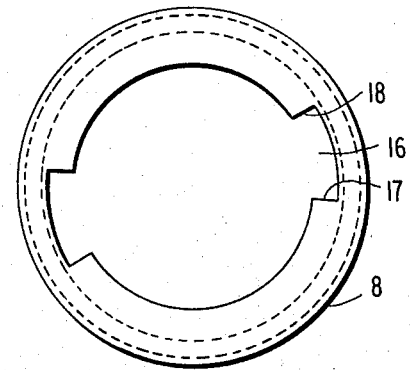
FIG.6

TANK CLOSURE ARRANGEMENT

The present invention relates to a closure arrangement and, more particularly, to a tank closure for a tank of a motor vehicle, which tank closure includes a bayonet cap having a pair of tension clamps which, during rotation of a housing of the cap, are simultaneously axially displaceable through a bayonet-type thread provided at a neck of the tank and are urged against the bayonet-type thread by a helical compression spring resting, in turn, on a bracket of a closing pipe guided in the housing of the cap and joined to the housing, with the helical compression spring urging a flange of the closing pipe, covered with an elastically resilient sealing ring of rubber or the like, onto an annular sealing surface of the neck of the tank.

Necks of tanks of, for example, motor vehicle fuel tanks, engine oil filling necks, and filling necks for power steering units or the like are in many instances sealed by a bayonet or one-turn lock arrangement. In proposed lock arrangements, a pretensioning force required to effect a seal between a tank cap gasket or seal means and a neck of the tank is provided by a compression spring upon a rotation of the tank cap. Upon rotation of the tank cap, a pair of tension clamps is axially displaced by way of the bayonet thread provided on the tank neck.

In proposed tank constructions, during a rotation of the cap to effect locking, the sealing rubber gasket or the like must be moved along a sealing surface of the tank neck in a circular movement. A disadvantage of the proposed tank cap constructions resides in the fact that the movement of the sealing gasket along the sealing surface takes place under a frictional force which increases in correspondence with a pitch of the bayonet thread and it is necessry to expand a relatively great force to overcome the increasing frictional force.

A further disadvantage of proposed tank cap constructions resides in the fact that swelling and shrinking of the elastically resilient gasket due to the effects of fuel and temperature as well as manufacturing tolerances at the cap part and neck section additionally increase the closing and opening forces necessary to effect a sealing of the tank.

While remedial measures have been proposed such as, for example, chlorination of the rubber material forming the sealing gasket as well as an enlargement of a free space between the tank cap and the sealing gasket, such remedial measures have not thus far resulted in the required improvement. Additionally, due to legal regulations, fuel tanks with an excess pressure feature are also to be introduced in the future and this means that, in correspondence with the excess pressure, even stronger helical compression springs must be utilized so that the friction forces during an opening and closing of the tank cap would be even further increased.

The aim underlying the present invention essentially resides in providing a tank closure arrangement for a motor vehicle tank which substantially reduces closing and opening forces without diminishing sealing properties of the closure between the sealing ring and sealing surface of a neck of the tank and also resides in providing a tank closure by which sealing properties between a sealing ring and tank neck are overcome even at a slight backward or reverse turning of the tank cap, without it being possible to lift the cap at this point so that excess pressure may be vented or relieved from the tank without the contents thereof being ejected from the tank, whereupon the tank cap, after a further backward or reverse turning up to a stop may then be lifted off.

In accordance with advantageous features of the present invention, a spacer sleeve formed of a "self-lubricating" synthetic resin, that is, a sleeve made of a material which readily slides on metal, is inserted between a flange of a closing pipe and the pair of tension clamps, with the spacer sleeve remaining stationary during a turning of the cap and maintaining, along a largest portion of a pivoting angle of the cap up to a final range of pivoting, a predetermined spacing between the flange of the closing pipe and the pair of tension clamps, which space is reduced in the final or closed condition of the cap.

Advantageously, in accordance with further features of the present invention, the spacer sleeve may be provided with a lug adapted to engage beside a clamping clip of the pair of tension clamps in a slot of a bayonet catch member at a neck of the tank and secure the spacer sleeve against pivoting during a turning of the attached tank cap.

Advantageously, in accordance with the present invention, mutually opposed slots are provided at the tank neck which are so wide that a lug and adjacent clamping clip of the pair of tension clamps may just barely be introduced and/or passed through one of the slots.

Advantageously, two boundary edges of the slots extend radially toward a center of the neck of the tank.

During a rotation of the tank cap of the closure arrangement of the present invention, the pair of tension clamps will move to a place beneath the bayonet thread but will not rest on a lower edge of the bayonet thread since the spacer sleeve is located between the flange of the closing pipe and the pair of the tension clamps. However, a lug of the spacer sleeve rests against the boundary edge of the slots and thereby retains the spacer sleeve so that the sleeve does not participate in a rotating movement of the tank cap. During a further rotation of the tank cap, the clamping clips of the pair of tension clamps enters a recess at the spacer sleeve so that now the helical compression spring has an opportunity to, on the one hand, press the sealing ring onto the circular sealing surface of the tank neck and the pair of tension clamps into a bottom edge of an inner wall of the closure base.

By virtue of the provision of two boundary edges of the slots which are oriented so as to extend radially toward a center of the neck of the tank, it is possible to prevent occurrence of radial components during a turning motion whereby the cap or spacer sleeve could be shifted radially thereby resulting in additional frictional force.

In accordance with the present invention, the spacer sleeve may also be composed of a linear strip and may be provided at one end with a closure member which simultaneously forms a detent lug; however, the spacer sleeve may also include sleeve sections which are obliquely divided at right angles to the longitudinal axis thereof with mutually contact areas of these sections being provided with meshing serrations. If the sections are placed upon one another and twisted, the total sleeve has a larger or smaller diameter depending upon the twisting direction.

It is also possible in accordance with the present invention, to provide a bearing or supporting ring which is inserted between the sealing ring and the actual spacer sleeve and, by virtue of this arrangement, the actual spacer sleeve may have a smaller height with one end of the sleeve being placed on the baring ring.

Accordingly, it is an object of the present invention to provide a tank closure arrangement, especially for a tank of a motor vehicle, which avoids, by simple means, shortcomings and disadvantages encountered in the prior art.

Another object of the present invention resides in providing a tank closure, especially for a tank of a motor vehicle that substantially reduces the closing and opening forces required while nevertheless ensuring the existence of a tight seal.

Yet another object of the present invention resides in providing a tank closure arrangement, especially for a tank of a motor vehicle, which enables a venting of excess pressure from the tank without an ejection of the contents therefrom.

Yet another object of the present invention resides in providing a tank closure arrangement, especially for a tank of a motor vehicle which is simple in construction and therefore relatively inexpensive to manufacture.

A still further object of the present invention resides in providing a tank closure arrangement, especially for a tank of a motor vehicle which readily compensates for manufacturing tolerances as well as deformation of the sealing element due to temperature and exposure to the contents of the tank.

These and other objects, features, and advantages of the present invention will become more apparent from the following description when taken in connection with the accompanying drawings which show, for the purposes of illustration only, several embodiments in accordance with the present invention, and wherein:

FIG. 1 is an axial cross sectional view of a tank closure arrangement in accordance with the present invention having a tank cap placed on a neck of a tank of a motor vehicle;

FIG. 2 is a perspective elevational view of an interior of a cap of a tank closure constructed in accordance with the present invention;

FIG. 3 is a top view of a spacer sleeve for a tank closure of the present invention;

FIG. 4 is a cross sectional view taken along the line IV—IV in FIG. 3;

FIG. 5 is a lateral view of a multipart spacer sleeve for a tank closure arrangement of the present invention provided with a spiral thread and adjusting teeth; and FIG. 6 is a top view of a tank neck for a tank closure arrangement constructed in accordance with the present invention;

Referring now to the drawings wherein like reference numerals are used throughout the various views to designate like parts and, more particularly, to FIG. 1, according to this figure, a tank closure arrangement includes a tank cap 1, a rubber or elastomer sealing gasket or ring 2 a pair of tension clamps generally designated by the reference numeral 3, and a spacer sleeve 4. The tension clamp 3 includes clamping clips 5 adapted to cooperate with a lower edge 6 of an inner wall 7 of a closure base 8 of a tank neck 9 so as to bring the sealing ring or gasket 2 in sealing contact with a circular sealing edge 10 of the closure base 8.

The tank cap 1, sealing ring or gasket 2, and the pair of tension clamps 3 are illustrated in two different positions with respect to the spacer sleeve 4. More particularly, on the right hand side of FIG. 1, one of the clamping clips 5 is at a beginning of a turning motion of the tank cap 1, shortly after the pair of tension clamps 3 have just travelled beneath the lower edge 6 of the inner wall 7, that is, a bayonet thread of the closure base 8 of the neck 9 of the tank, but in such a manner that there still remains a space between the lower edge 6 and the clamping clip 5 as well as between the sealing ring 2 and circular sealing edge 10 of the closure base 8. The left hand side of FIG. 1 illustrates the tank closure arrangement in a sealed end position.

Basically, with the bayonet-type cap having a pair of tension clamps 3 for a tank closure utilized, for example, for closing a tank of a motor vehicle, the pair of tension clamps 3 is axially displaceable during a turning of the tank cap 1 by the bayonet thread formed by the lower edge 6 of the inner wall 7 of the closure base 8. The pair of tension clamps 3 is urged against this thread of the lower edge 6 of the inner wall 7 of the closure base 8 by a compression spring 11 one end of which rests on a bracket 12 of a closing pipe 13, guided in a housing of the tank cap 1 and joined thereto, so as to urge the closing pipe 13 and, especially a flange 14 thereof covered with the sealing gasket or ring 2 of rubber or another elastically resilient material, onto the circular sealing edge 10 of the closure base 8 of the tank neck 9.

In the usual tank closure construstions, the spring 11 urges th pair of tension clamps 3 along an entire path of the pitch of the bayonet thread formed by the lower edge 6 with an ever increasing force against the lower edge 6 and/or presses the sealing ring or gasket 2 which, in most cases consists of rubber or a similar material, against the circular sealing edge 10 of the closure base 8 of the tank neck 9. During a turning of the tank cap 1, the pair of tension clamps 3 as well as the sealing gasket or ring 2 is twisted with respect to the closure base 8 and, because of this, considerably great friction forces must be overcome.

To avoid the necessity of overcoming the considerable frictional forces during an opening and closing of the closure, as shown in FIG. 1, the spacer sleeve 4 is disposed between the flange 14 and the pair of tension clamps 3. The spacer sleeve 4 has a sufficient axial length or height such that a spacing cap C from the pair of tension clamps 3 to the sealing gasket or ring 2 is greater than a spacing D between the lower edge 6 and the sealing edge 10. Thus, even with unfavorable manufacturing tolerances of the tank cap 1, the pair of tension clamps 3, and/or the bayonet guide thread formed by the lower edge 6, a minimum spacing A is present between the sealing gasket or ring 2 and the circular sealing edge 10 at the closure base 8.

The spacer sleeve 4 is formed of a "self-lubricating" synthetic resin, that is, a plastic composition which readily slides on metal. The spacer sleeve 4 remains stationary during a turning of the tank cap 1 and, for this purpose, as shown in FIGS. 2 and 6, a lug 15 is provided which, upon an attachment of the tank cap 1, is, together with one clamping clip 5 of the pair of tension clamps 3, inserted in a slot (FIG. 6) customarily provided at the tank neck 9. During a rotation or twisting of the tank cap 1 in a closing direction, the lug 15 abuts at an edge 17 of the slot 16 while the pair of tension clamps 3 move along the lower edge 6 of the inner wall 7 of the closure base 8.

As shown in FIG. 2, the spacer sleeve 4 also includes two diametrically disposed indentations or recesses 19, each of which have a depth greater than the spacing A so as to enable the pair of tension clamps 3 to approach the sealing gasket 2 whereby the pair of tension clamps 3 and the sealing gasket or ring 2 grasp between them the closure base 8 on its lower edge 6 and the circular sealing edge 10. During a backward or reverse turning movement of the tank cap 1, an opposite side of the lug 15 is brought into abutment with an edge 18 of the slot 16 and is thereby turned back to its original position with respect to the tank cap 1. To prevent transverse forces from arising during a rotation or twisting of the tank cap 1, which transverse forces would force the cap to be displaced from a centered position and thus further increase the frictional forces, the two boundary edges 17, 18 of the slots 16 are radially aligned toward a center of the tank neck 9.

As shown in FIG. 3, it is also possible to provide a spacer sleeve 4' which is composed of a single straight strip which includes a locking part simultaneously forming a detent lug 15'. The locking part may be connected to a free end 20 of an initially stretched strip forming the spacer sleeve 4' and may be connected to the lug 15 by means of suitable fasteners such as screws or rivets 21, teeth, or the like so as to result in the formation of a closed ring.

As shown in FIG. 5, a spacer sleeve 4" may be provided which is composed of two parts 22, 23 each of which have an oblique and dividing edge with the respective dividing edges of the sleeve parts 22, 23 having meshing teeth which may be joined so that they are rotated with respect to each other by virtue of which the total sleeve 4", composed of parts 22 and 23, may have a larger or smaller height H in dependence upon the direction of rotation.

As also shown in FIG. 1, a bi-partite spacer sleeve 4''' may be provided and arranged in such a way that the sleeve 4''' has a height H which is less than or smaller than the spacer sleeve 4 with the spacer sleeve 4''' resting on a bearing ring 25. By virtue of the provision of a spacer sleeve 4''', a construction is provided which is more readily adapted to a rounded configuration 26 of the tank cap 1 produced by the pressing step.

While I have shown and described several embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A closure arrangement for a tank provided with a tank neck having a means for defining a bayonet-type thread, the arrangement including a tank cap means adapted to be mounted on the tank neck, a pair of tension clamp means, means for mounting the tansion clamp means so as to be axially displaceable, a closing pipe means guided in tank cap means, the closing pipe means including a flange means, and a sealing means mounted on the flange means, characterized in that a spacer sleeve means is inserted between the flange means and the tension clamp means for maintaining a predetermined spacing between the flange means and the tension clamp means over a predetermined rotation of the tank cap means, means are provided for maintaining the spacer sleeve means stationary during a rotation of the tank cap means, and in that means are provided on the spacer sleeve means for reducing the predetermined spacing when the tank cap means is rotated to a final position whereby the sealing means is brought into contact with a sealing surface of the tank neck.

2. A closure arrangement according to claim 1, characterized in that a spring means is provided for normally biasing the tension clamp means into engagement with the bayonet-type thread, a bracket means is provided on the closing pipe means for supporting one end of the spring means with a second end of the spring means abutting the tensioning clamp means.

3. A closure arrangement according to claim 2, characterized in that the spacer sleeve means is formed of a synthetic resin material.

4. A closure arrangement according to claim 3, characterized in that the synthetic resin material is of a self-lubricating type so as to enable the spacer sleeve means to readily slide on metal.

5. A closure arrangement according to one of claims 1, 2, 3, or 4, characterized in that each of the pair of tension clamp means includes a clamping clip, the means for maintaining of the spacer sleeve means stationary includes a lug means cooperable with at least one of the clamping clips so as to secure the spacer sleeve means against a pivoting during a turning of the tank cap means.

6. A closure arrangement according to claim 5, characterized in that the tank neck includes two mutually opposed slots, and in that the slots have a width which enables the lug means and adjacent clamping clip to just barely be inserted into one of the slots.

7. A closure arrangement according to claim 6, characterized in that each of the slots includes a pair of boundary edges, and in that the boundary edges extend radially toward a center of the tank neck.

8. A closure arrangement according to claim 7, characterized in that the sealing means is a sealing gasket formed of an elastomer.

9. A closure arrangement according to claim 8, characterized in that the tank is a fuel tank of a motor vehicle.

10. A closure arrangement according to one of claims 1, 2, 3, or 4, characterized in that the means for reducing the predetermined spacing includes a pair of mutually oppositely disposed indentations provided in the spacer sleeve means at a position at which the clamping clips are to be stopped in the final position of the tank cap means, and in that each of the indentations includes an oblique edge so as to enable a reduction in the spacing between the sealing means and the pair of tension clamp means so as to permit a secure sealing contact of the sealing means on the sealing surface of the tank neck.

11. A closure arrangement according to one of claims 1, 2, 3, or 4, characterized in that the spacer sleeve means is formed as a strip, and in that locking means are provided for securing respective ends of the strip together so as to form a closed ring.

12. A closure arrangement according to claim 11, characterized in that the means for maintaining the spacer sleeve means stationary is a detent lug means formed by the locking means.

13. A closure arrangement according to claim 12, characterized in that the sealing means is a sealing gasket formed of an elastomer.

14. A closure arrangement according to one of claims 1, 2, 3, or 4, characterized in that the spacer sleeve means includes a pair of sleeve sections divided obliquely transversely to a longitudinal axis of the spacer sleeve means, each of said sleeve sections have mutually contacting surfaces and in that means are provided on the mutually contacting surfaces for enabling an increase and decrease in a total height of the spacer sleeve means upon a twisting of the sleeve sections relative to one another.

15. A closure arrangement according to claim 14, characterized in that the means for enabling an increase and decrease in the total height of the spacer sleeve means includes meshing teeth provided on each of the contact surfaces.

16. A closure arrangement according to one of claims 1, 2, 3, or 4, characterized in that the spacer sleeve means includes a spacer sleeve and a bearing means interposed between the spacer sleeve and the sealing means, the bearing ring means being disposed above a top end of the spacer sleeve.

17. A closure arrangement according to claim 16, characterized in that the sealing means is a sealing gasket formed of an elastomer.

* * * * *